(12) United States Patent
Fleischman (10) Patent No.: US 7,519,009 B2
(45) Date of Patent: Apr. 14, 2009

(54) VIRTUAL EXTERIOR GATEWAY PROTOCOL AND RELATED METHODS

(75) Inventor: Eric W Fleischman, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 628 days.

(21) Appl. No.: 10/952,979

(22) Filed: Sep. 29, 2004

(65) Prior Publication Data

US 2006/0072478 A1 Apr. 6, 2006

(51) Int. Cl.
*H04W 4/00* (2006.01)
*H04L 12/28* (2006.01)
*H04L 12/56* (2006.01)

(52) U.S. Cl. .................. 370/254; 455/338; 455/400; 455/401; 455/406; 455/411

(58) Field of Classification Search .............. 370/238.1, 370/400–411, 434, 447, 395.31–395.32, 370/395.5, 395.54, 912–913, 901–903, 462–463, 370/238, 254, 349–358, 338, 328–329, 341–342, 370/423, 396–399, 251–258, 331, 386–394, 370/465–469; 709/218–219, 237–246, 228, 709/231, 248–250; 455/428, 509, 445–446, 455/449–451, 452.1, 41.2, 524, 557, 560–561, 455/550.1, 556.1; 713/153, 155; 719/311

See application file for complete search history.

(56) References Cited

U.S. PATENT DOCUMENTS 6,820,134 B1 * 11/2004 Zinin et al. ................. 709/238
6,907,039 B2 * 6/2005 Shen ........................... 370/400
7,062,782 B1 * 6/2006 Stone et al. .................... 726/22
7,161,929 B1 * 1/2007 O'Neill et al. ............... 370/349
7,190,678 B2 * 3/2007 Thubert et al. .............. 370/254
2002/0181402 A1 * 12/2002 Lemoff et al. ............... 370/238
2003/0012145 A1 * 1/2003 Bragg ......................... 370/254
2003/0014540 A1 * 1/2003 Sultan et al. ................ 709/240
2003/0046390 A1 * 3/2003 Ball et al. .................... 709/224
2003/0137974 A1 * 7/2003 Kwan et al. ................. 370/352
2004/0044786 A1 * 3/2004 Basso et al. ................. 709/238
2004/0228343 A1 * 11/2004 Molteni et al. .............. 370/392
2005/0041591 A1 * 2/2005 Duggi et al. ................. 370/238
2005/0175009 A1 * 8/2005 Bauer .......................... 370/390
2005/0240835 A1 * 10/2005 Dragnea et al. ............... 714/47
2006/0029035 A1 * 2/2006 Chase et al. ................. 370/351
2006/0029074 A2 * 2/2006 Bauer .......................... 370/390

FOREIGN PATENT DOCUMENTS

WO WO 01/06732 A1 * 1/2001

* cited by examiner

*Primary Examiner*—Meless N Zewdu
(74) *Attorney, Agent, or Firm*—Harness, Dickey & Pierce, P.L.C.

(57) ABSTRACT

An aggregation of a plurality of networks. The aggregation includes a plurality of peer nodes of the networks, each node including a plurality of channels operating at a plurality of interior gateway protocol (IGP) routing levels configured to provide a mesh interface between at least two of the networks. This aggregation makes it possible to configure extremely large aggregated networks. It also supports inter-autonomous system (AS) mobility and movement needs of mobile ad-hoc network (MANET) networks.

27 Claims, 5 Drawing Sheets

VIRTUAL EXTERIOR GATEWAY PROTOCOL AND RELATED METHODS

FIELD OF THE INVENTION

The present invention relates to communication networks and more particularly (but not exclusively) to communication interfaces between networks.

BACKGROUND OF THE INVENTION

An autonomous system (AS), also sometimes referred to as a routing domain, is a network having a single defined Internet routing policy. The Internet may be described as a network-of-networks, that is, a network of ASes linked with one another via an exterior gateway protocol (EGP). The current EGP of the Internet is the Border Gateway Protocol version 4 (BGPv4). ASes of the Internet for the most part share stable, pair-wise interfaces. These interfaces usually occur across wire-based network infrastructures. A mobile ad hoc network (MANET) is an autonomous system of primarily mobile nodes, e.g., mobile routers, connected primarily by wireless links. In contrast to most other autonomous systems, MANETs can be extremely flexible and are often characterized by a significant amount of mobility and geographical movement.

Because MANET nodes are mobile, however, a topology of a MANET network nodes may change quickly and unpredictably. Connectivity may be intermittent between MANET nodes, and wireless links can create the appearance of rapid topology changes through signal intermittence, even if no movement is actually occurring. Rapid topology changes often detrimentally impact convergence of routing protocols, making these protocols less reliable. BGPv4 is designed to operate within a context of providing a stable, pair-wise interface between peer nodes in different ASes. This approach can break down when a pair-wise interface peer in one AS moves out of transmission range of its peer in another AS. BGPv4 can also break down when one peer dynamically establishes a new pair-wise relationship with a new peer that comes in range in the other AS. Thus, BGPv4 is not well-suited to support highly mobile environments.

The Internet protocol (IP) currently supports a hierarchical topology system according to which network interfaces of nodes are connected into subnetworks and subnetworks are connected into networks (ASes). Subnetworks may be connected into ASes by means of interior gateway protocols such as Open Shortest Path First (OSPF) and/or Intermediate System-Intermediate System (IS-IS). As previously mentioned, ASes may be connected via EGP protocols into the Internet.

ASes of very large entities often are limited in size because of IP scaling properties of IGP protocols. A very large entity network may be physically realized as a plurality of ASes linked together by EGP protocols, even though the ASes share a common security and quality-of-service (QoS) policy and common administrative and business attributes. Because EGP protocols provide only pair-wise relationships, segmenting a large entity network into a series of ASes connected by EGP generally constrains the flexibility of the network design and can create bottlenecks within the network communication paths.

SUMMARY OF THE INVENTION

The present invention, in one configuration, is directed to an aggregation of a plurality of networks. The aggregation includes a plurality of peer nodes of the networks, each node including a plurality of channels operating at a plurality of interior gateway protocol (IGP) routing levels configured to provide a mesh interface between at least two of the networks.

In another configuration, an aggregation includes first and second networks. A plurality of nodes include a plurality of hierarchical routing levels through which the first network is linked with the second network. Each node further includes a first channel through which the node is linked with the first network at a first of the routing levels, and a second channel through which the node is linked with the second network at a second of the routing levels.

In another configuration, an aggregated autonomous system (AS) includes a plurality of networks each having a backbone. A plurality of nodes of the backbones provide a plurality of hierarchical interfaces among the component networks.

In one implementation, the invention is directed to a method of communicating with a second network via a first network. A packet is routed from the first network to a meshed backbone that inter-connects the first network with a plurality of networks including the second network. The packet is received at a first IGP routing level. The packet is routed at a second IGP routing level to the second network. The receiving and routing steps are performed using a router of the backbone.

In yet another configuration, the invention is directed to a machine-readable medium for use with a processor having a memory. The machine-readable medium includes instructions to cause a router of a meshed backbone inter-connecting a plurality of networks including first and second networks to receive a packet from the first network at a first IGP routing level. Instructions also cause the router to route the packet to the second network at a second IGP routing level.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Although various configurations of the present invention are described with reference to a mobile ad-hoc network (MANET), the invention is not so limited. The invention can be practiced in connection with various network environments, wired and/or wireless. Configurations of the invention also can be appropriate for extremely large autonomous system environments and/or joint networks shared, for example, among businesses and/or other enterprises. Configurations also are contemplated with respect to networks, e.g., joint or coalition tactical military networks, shared by governmental entities.

In one embodiment of the present invention, an aggregation of networks includes a plurality of peer nodes, e.g., radio routers, of the networks. The nodes have multi-channel capabilities and are configured to operate at a plurality of Interior Gateway Protocol (IGP) routing levels. The peer nodes can be used to provide a mesh interface among a plurality of the networks.

Figure 1:
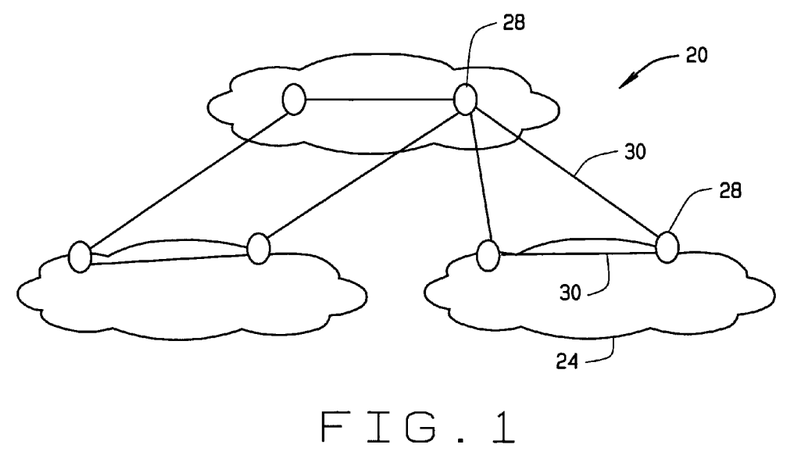
FIG. 1 is a diagram of an aggregation of networks in accordance with one embodiment of the present invention.

One configuration of an aggregation of networks is indicated generally in FIG. 1 by reference number 20. A plurality of networks 24 communicate via a plurality of nodes 28 which may be a subset of routers of the networks. Each node 28 includes a plurality of channels 30 allowing the node to simultaneously transmit and receive on at least two different IP subnetworks (not shown) of the aggregation 20. Each of the nodes 28 is configured with a plurality of instances of a hierarchical Internet IGP to define a plurality of routing levels. Each instance is associated with a physical channel 30. The IGP may be, for example, OSPF (Open Shortest Path First) protocol or IS-IS (Intermediate System-Intermediate System) protocol. The routing levels are organized such that an IGP instance operating at a lower level of abstraction within a node 28 locally provides aggregated routing information to an IGP instance operating at a higher level of abstraction in the node.

Generally, unless otherwise specified, various configurations of the present invention are described in terms of OSPF. The OSPF and IS-IS protocols operate in the same or a similar manner. Thus the various implementations should be easily understood in terms of IS-IS by one knowledgeable in the art.

Figure 2:
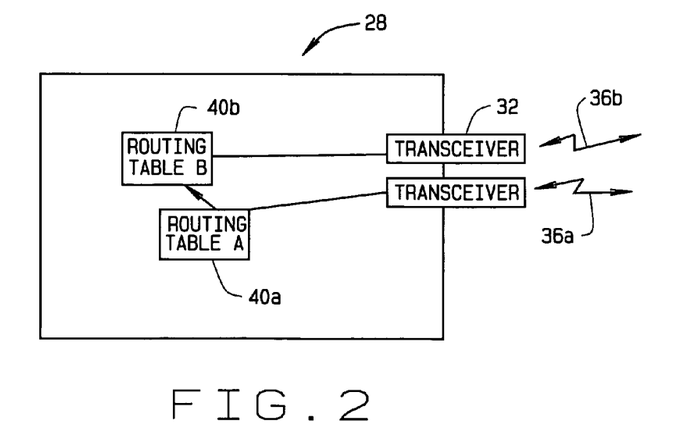
FIG. 2 is a diagram of a node in accordance with one embodiment of the present invention.

A node 28 is shown in greater detail in FIG. 2. At least two transceivers 32 of the node 28 can simultaneously transmit and receive using at least two distinctly configured waveforms 36a and 36b such that the waveforms 36a and 36b operate on different IP subnetworks. Referring to the configurations shown in FIGS. 1 and 2, it is assumed for simplicity that the node 28 operates at two levels of abstraction: a lower level and a higher level. The waveform 36a is used for communication at the lower level of abstraction between and within the networks 24. The waveform 36b is used for communication among the nodes 28 at the higher level of abstraction. The nodes 28 thus form an IGP community operating at the higher level of abstraction.

An IGP routing table 40a is associated with an IGP instance operating at the lower level of abstraction and cumulatively defines a topology of the networks 24. The routing table 40a locally transfers a summary of its view of the topology of networks 24 to a routing table 40b that operates at the higher level of abstraction. The routing table 40b thereby obtains a complete summary view of the aggregation 20, in that the routing table 40b describes the nodes 28 which are local to one another, together with the networks 24 that include each of the nodes 28. The routing table 40b thus describes which node 28 provides a path to a given underlying network element (not shown) located within the networks 24.

Although the foregoing description is in relation to two IGP routing levels, it is possible to define more than two IGP routing levels. A number of levels could depend, for example, on the scale of networks being aggregated (e.g., a number of networked devices in such a system). It also is contemplated that nodes, e.g., radio-routers, could be used which include more than two transceivers and can simultaneously operate at more than two IGP routing levels.

Figure 3:
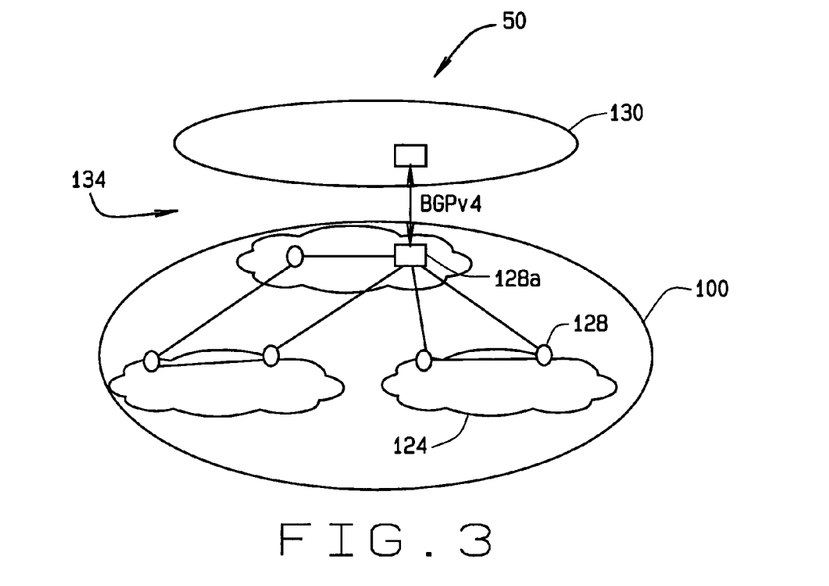
FIG. 3 is a diagram of an Internet environment including an aggregation of networks in accordance with one embodiment of the present invention.

Another embodiment of an aggregation is shown in an Internet environment indicated generally in FIG. 3 by reference number 50. An aggregation 100 includes a plurality of networks 124 and a plurality of nodes 128 using a plurality of IGP levels. A node 128a of the aggregation 100 provides a well-known BGPv4 interface between itself and another AS 130 in the traditional exterior gateway protocol (EGP) manner. Thus the aggregation 100 can operate as a distinct autonomous system (AS) with other ASes via pairwise interfaces via the Internet, indicated generally by reference number 134.

In Table 1, a known topology of the Internet and a new topology system in accordance with principles of the present invention are shown.

TABLE 1

| Internet Topology: | New Topology System: |
| --- | --- |
| Network-of-Networks (Internet) | Network-of-Networks (Internet) Aggregation |
| Network (AS) | Network (AS) |
| Subnetwork | Subnetwork |
| Node's IP Interface | Node's IP Interface |

Referring to Table 1 and FIG. 3, the aggregation 100 forms a new type of entity between system boundaries of the traditional Internet topology model, that is, between a network and a network-of-networks (Internet). Generally, unless otherwise indicated, the term "network" is used to refer to an AS included in an aggregation such as the aggregation 100. A network 124 in the aggregation 100 does not maintain its own AS number, but uses a common AS number associated with the aggregation 100 and used by all networks 124 in the aggregation 100.

It is possible to define a plurality of tiers of networks in accordance with principles of the present invention. For example, another aggregation in accordance with one embodiment of the present invention is indicated generally in FIG. 4 by reference number 200. The aggregation 200 includes a plurality of networks (i.e., ASes) 224. A network 224 includes one or more OSPF areas 226 (or, alternatively, one or more IS-IS areas) including one or more IP subnetworks (not shown in FIG. 4). A network 224 may have one or more local routers 236.

A plurality of routers 228 having interfaces 230 relative to the networks 224 are logically joined together in a separate backbone network 234. The backbone network 234 may be referred to as an "upper network". The networks 224 linked together by the backbone network 234 may be referred to as "lower networks". In the configuration shown in FIG. 4, three lower networks 238a-c are linked to the upper network 234.

Generally, in various embodiments of the present invention, hierarchical interior gateway protocols (IGPs) such as OSPF and/or IS-IS can be used to provide mesh relationships between networks, including but not limited to mobile networks, in a manner that appears to an IGP instance in a network node as being an exterior gateway protocol (EGP). There is no requirement that an upper or lower network use the same hierarchical IGP as another network. For example, an upper network could use IS-IS and lower networks could use OSPF. Alternatively, some lower networks could use IS-IS and other lower networks could use OSPF.

Referring again to FIG. 4, the lower networks 238a-c do not directly access each other except through the upper network 234. The routers 228 have interfaces 230 within Areas 0 (i.e., network backbones) of the networks 234 and 238. An OSPF instance operating in a router 228 views that router as being an autonomous system boundary router (ASBR).

Figure 4:
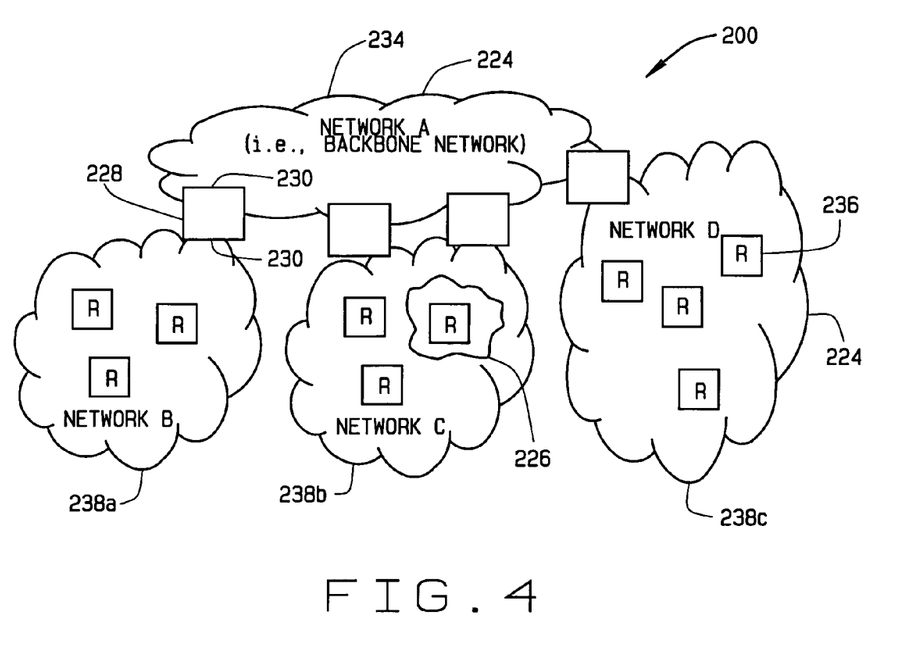
FIG. 4 is a diagram of an aggregation of networks in accordance with one embodiment of the present invention.

External routing information that is shared by the routers 228 is locally leaked to one OSPF link state database (LSDB) of a router 228 from another OSPF LSDB maintained on that router.

Similar to OSPF area border routers (ABRs) and ASBRs, the routers 228, which physically link the upper network 234 with lower networks 238, simultaneously include interfaces to entities within a plurality of networks 224. In such manner, a network, e.g., a MANET, including a plurality of tiers can be combined with other networks to form an aggregation having a backbone network infrastructure that functions in the same or similar manner as an Area 0 of hierarchical OSPF and/or backbone of IS-IS. A router 228 uses link state advertisement (LSA) 5 connections into Area 0 and/or backbone. Networks thus can form mesh relationships with one another in order to form a larger aggregated network construct. Such relationships are in contrast to those of BGP, which uses only pairwise relationships between network entities.

Additionally, an aggregation of networks can operate as an autonomous system (AS). For example, an aggregation can communicate with other autonomous systems not included in the aggregation via an exterior gateway protocol (EGP) such as BGP using a single AS number for the aggregation. In the present exemplary configuration inter-AS relationships between the aggregation 200 and other ASes (not shown) is supported from Area 0 of the upper network 234.

Figure 5:
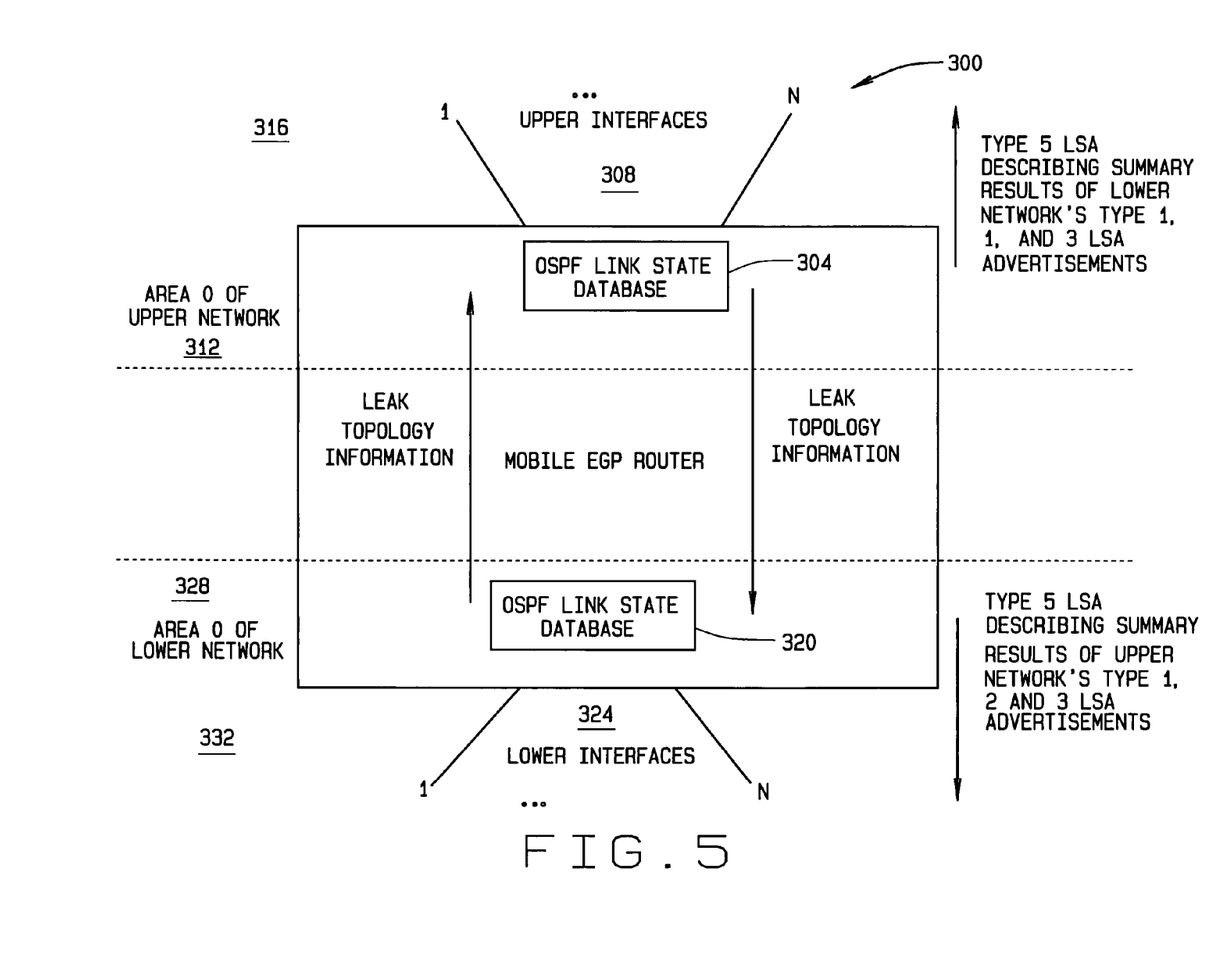
FIG. 5 is a diagram of a node in accordance with one embodiment.

A configuration of a node is indicated generally in FIG. 5 by reference number 300. The node 300 includes an upper OSPF link state database (LSDB) 304 relative to upper interfaces 308 in an Area 0 (numbered as 312) of an upper network 316. The node 300 also includes a lower OSPF LSDB 320 relative to lower interfaces 324 in an Area 0 (numbered as 328) of a lower network 332. Summary topology information in the lower and upper LSDBs 324 and 308 may be exchanged, e.g., locally leaked, between the LSDBs on a periodic basis, for example, dependent on events and/or timers. In one configuration, information is leaked every sixty (60) seconds. In another configuration, topology information in the lower and upper LSDBs 324 and 308 may be exchanged via link state advertisements (LSAs).

LSA information leaked by the LSDB 304 is a summary of topology information known about the upper network 316 within its associated Area 0 (numbered as 312). Such information is obtained from Type 1 LSAs, Type 2 LSAs, and/or Type 3 ABR Summary LSAs for the upper network 316. LSA information leaked by the LSDB 320 is a summary of topology information known about the lower network 332 within its associated Area 0 (numbered as 328). Such information is obtained from Type 1 LSAs, Type 2 LSAs, and/or Type 3 ABR Summary LSAs for the lower network 332. In the foregoing manner, upper and lower network routing information is exchanged.

Leaked information becomes announced by the appropriate IGP instance in the node 300 to the appropriate network 316 or 332 as a whole. Specifically, a local IGP instance relating to the lower network 332 distributes information about the upper network 316 via Type 5 LSA announcements to the lower network 332. Similarly, a local IGP instance relating to the upper network 316 distributes information about the lower network 332 via Type 5 LSA announcements to the upper network 316.

Autonomous systems may be configured as aggregations in various ways. One exemplary aggregation is indicated generally in FIG. 6 by reference number 400. The aggregation 400 may be, for example, a MANET in communication with a remote AS (not shown). Two lower networks 424 of the aggregation 400 each include a local backbone 428 linking one or more subnets 432. The backbones 428 are hierarchically meshed with a backbone 436 of an upper network 440. Each of a plurality of nodes in the backbones 428 and 436 includes a plurality of channels as previously discussed with reference to FIG. 2 to provide a plurality of channel interfaces 438. Each interface 438 is associated with a corresponding LSDB as previously discussed with reference to FIG. 5. The MANET 400 communicates via a BGPv4 interface 442 with the remote AS (not shown).

Figure 7:
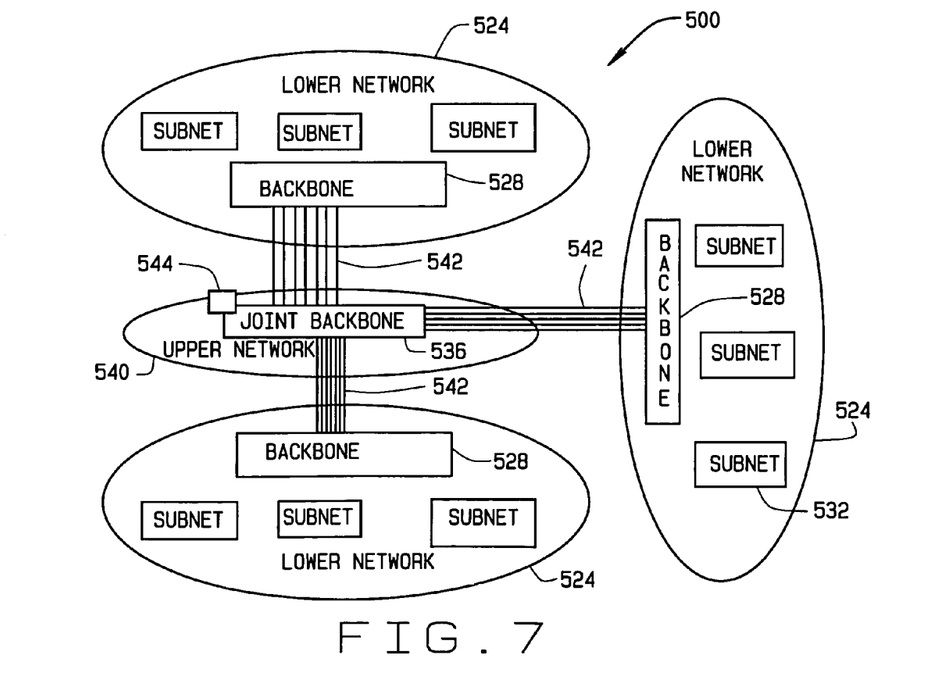

Another exemplary aggregation is indicated generally in FIG. 7 by reference number 500. The aggregation 500 may be, for example, aggregated MANET networks in communication with a remote AS (not shown). Three lower networks 524 each include a local backbone 528 linking one or more subnets 532. The local backbones 528 are meshed with a joint backbone 536 of an upper network 540 such that any one of the lower networks can communicate with any other lower network 524 via the joint backbone 536 and channel interfaces 542. The MANET 500 communicates via a BGPv4 interface 544 with the remote AS.

Figure 6:
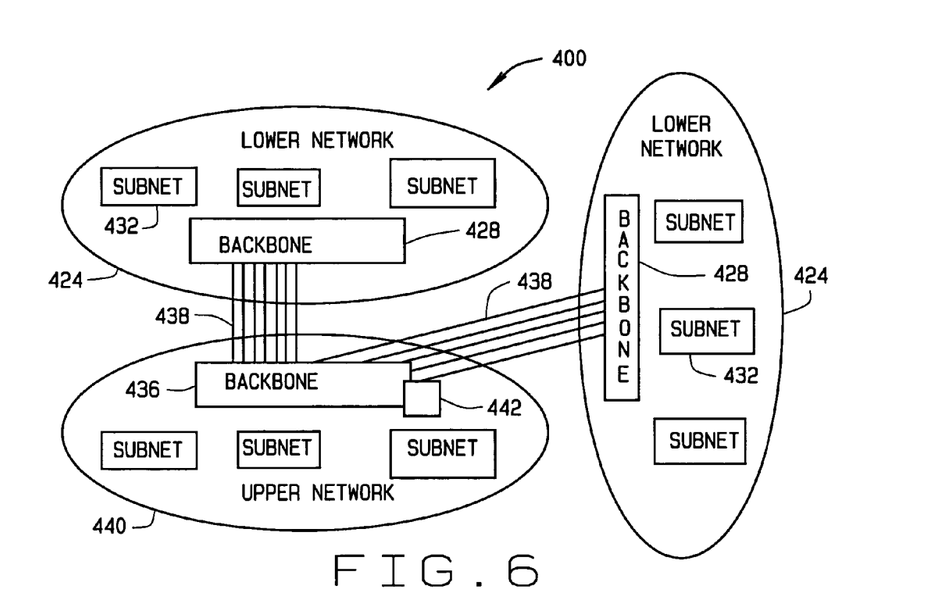
FIGS. 6-9 are diagrams of aggregations of networks in accordance with various embodiments.

The aggregation 500 provides more backbone interfaces 542 and associated LSDB instances than the aggregation 400 (shown in FIG. 6). Compared to nodes (not shown in FIG. 6) of the backbone 436, nodes (not shown in FIG. 7) of the backbone 536 have greater channel capabilities to support the interfaces 542. Thus, although the aggregations 500 and 400 both include upper and lower networks, more networks can be linked together in the aggregation 500 than in the aggregation 400.

It is not necessary for all backbone 536 nodes to provide IP interfaces, with associated IGP instances, to all linked backbone 528 nodes. Where each backbone 536 node has an IP interface link to the joint backbone 536 subnetwork, then a given backbone 536 node can have links to fewer than all backbones 528. Thus, in the present exemplary configuration, backbone nodes 536 cumulatively, but not necessarily individually, have links to all of the connected backbones 528 and 536.

It also should be understood that at least some routers (not shown in FIG. 7) of a given backbone 528 function in the same or a similar manner as an OSPF ABR relative to one or more subnets 532 within other areas (not shown in FIG. 7) of the network 524 that includes the given backbone 528. Such routers may or may not be nodes configured as described with reference to FIG. 5. Where a router is configured in both of the foregoing ways, it operates the same as or similar to an OSPF ABR only with respect to one network 524 but can operate as described with reference to FIG. 5 with respect to a plurality of networks 524.

Generally, the present concept of upper and lower networks is a logical concept that occurs locally within each node configured as described with reference to FIG. 5. Therefore, it is possible to define mesh topologies in which a single network is a lower network relative to a second network and an upper network relative to a third network. An aggregation configured in accordance with the foregoing discussion is indicated generally in FIG. 8 by reference number 600. The aggregation 600 may be, for example, a MANET or a wired network in communication with a remote AS (not shown). Three networks 624a-c each include a backbone 628 linking one or more subnets 632. The network 624b is a lower network relative to the network 624c and is an upper network relative to the network 624a. The network 624a is a lower network relative to both networks 624b and 624c.

Figure 8:
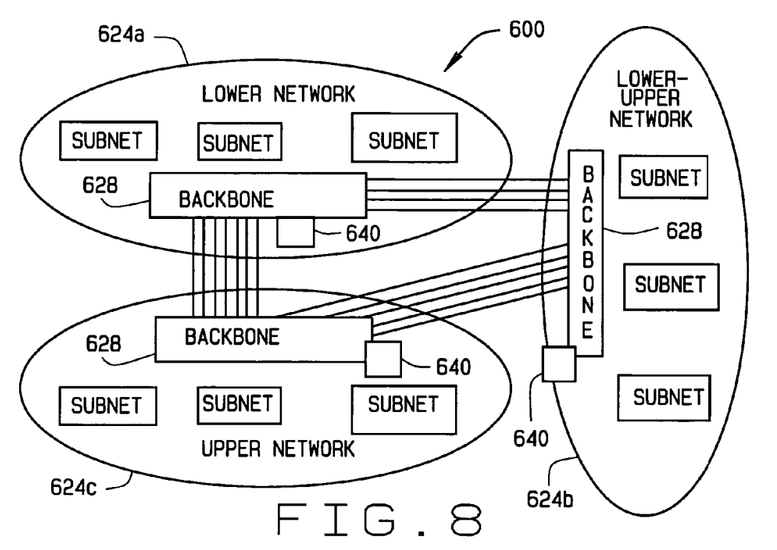

The backbones 628 are fully meshed with one another. Therefore the aggregation 600 is less subject to communication bottleneck occurrences than the aggregations 400 and

500. Additionally, the aggregation 600 includes a plurality of BGPv4 interfaces 640 with the remote AS located in different backbones, in contrast to the aggregation 500 (shown in FIG. 7) in which BGP interfaces are associated solely with the joint backbone 536. Each BGP interface 640 is associated with a different network 624. Therefore no single point of failure exists in the aggregation 600 with respect to communication with the remote AS (not shown). That is, if one interface 640 were to fail, another interface 640 could be used.

Figure 9:
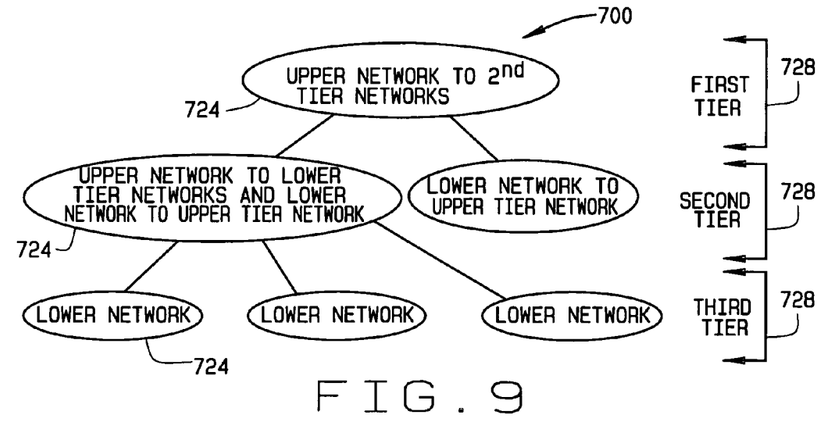

It is possible to configure nodes to include interfaces to two or more networks. The term "coalition network" is used to refer to a domain that includes a plurality of defined routing policies, i.e., a plurality of networks sharing similar policies (e.g., similar security and QoS policies) under the same high-level authority (e.g., a governmental entity). It is possible to configure coalition networks as aggregations having more than two tiers. One such aggregation is indicated generally in FIG. 9 by reference number 700. The aggregation 700 includes a plurality of networks 724 configured hierarchically as a plurality of tiers 728, three of which are shown. The tiers 728 are formed as described with reference to FIGS. 1-8. It should be understood that although the tiers 728 are referred to in FIG. 9 as "first", "second" and "third" tiers, other tiers could be present in the aggregation 700 although not shown in FIG. 9.

Generally, OSPF Area IDs (AIDs) of networks within an aggregation are disjoint. That is, AIDs are local to a network and are not visible outside of that network within the aggregation. At a base routing level of IGP abstraction within a node, an IGP instance operates in the same or similar manner as IGP as implemented and deployed in known Internet environments.

Within an aggregation in accordance with principles of the invention, each network address (i.e., each Internet Protocol (IP) address) is global within that aggregation and belongs to the same IP address space. For example, all addresses operate at the same classification level. Network address translators (NATs) do not exist in one configuration of an aggregation. In an alternative configuration, NATs may be deployed in such a manner that their existence is transparent to the aggregation. Aggregated networks share a single AS number. That is, an aggregation forms a single AS and thus has its own AS number. BGPv4 operates in the traditional manner with respect to an aggregation and with respect to ASes outside the aggregation.

Embodiments of aggregations may be used to provide mesh relationships among networks sharing similar QoS (quality of service) and security policies. Configurations of aggregations can be used in various Internet configurations, including but not limited to IPv6. Operation of aggregations is transparent from the standpoint not only of BGPv4, but also from the standpoint of various EGPs that could be used to provide Internet connections, including but not limited to Multi-protocol Border Gateway Protocol (MBGP).

When implemented in connection with mobile networks, configurations of the present invention can make it possible for such networks to continue operating during dynamic network redefinition. Embodiments of the present invention can provide a mechanism by which highly mobile networks can be flexibly combined into larger network groupings that support comparatively dynamic mesh interfaces with each other. Multiple peers can be defined between networks that can maintain communications between the networks whenever any communicating peer in one network is within transmission range of any peer in the other network.

BGPv4 requires that all communications between ASes occur across a small set of (often one or two) well-known, pair-wise interfaces. This requirement can result in both a single point of failure and a communications bottleneck for highly mobile environments. In a tactical military environment, effects of attrition (i.e., destruction) of such interfaces could result in communication failure between ASes. However, such events can also occur through movement or signal attenuation or loss. For this reason, pair-wise interfaces generally are inappropriate to link highly mobile environments together. Aggregations and mesh configurations can alleviate these vulnerabilities and can prevent communication bottlenecks.

The foregoing mesh configurations can alleviate a multi-homing problem currently associated with BGPv4. When an AS connects to two different Internet Service Providers (ISPs), the AS is said to be "multi-homed" because there are two different paths by which remote entities may communicate with the AS (i.e., through either of the connecting ISPs). Multi-homing is performed so that communications to the AS may continue in the event of a network failure within one of its supporting ISPs. Unfortunately, problems can arise within highly mobile environments, such as MANET networks, where network relationships are potentially continually changing. These problems can be resolved by establishing mesh interfaces between AS entities, potentially including multiple autonomous systems that perform ISP-like services (e.g., satellite networks).

The foregoing aggregations and mesh interfaces provide a solution that supports both stable (e.g., wire line networks) and highly mobile (e.g., wireless MANET networks) environments, permitting the two to cleanly interoperate together. Configurations of the invention provide a solution to avoid rapid redefinition of a mobile AS when changing signal receptivity causes the network to segment or recombine and to thereby alter mobile network memberships.

The foregoing aggregations and mesh configurations free a MANET from being required to operate either as a standalone network or as a stub network within a larger infrastructure in order to operate efficiently. A MANET operating as a stub previously was constrained to operate via a few well-defined pair-wise interfaces, and routing information had a high probability of being lost should any of the interfaces move out of range of each another. Now, however, a MANET can be un-tethered and can grow extremely large when implemented in accordance with principles of the present invention.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An aggregation comprising:
   at least first and second autonomous systems (ASs); and
   a node between and linking the first and second ASs, the node having:
   a first channel physically linked with the first AS, and a first internal gateway protocol (IGP) instance operating on the first channel to provide a first IGP routing level between the first AS and the node, the first IGP instance configured on the node to receive, and to leak to a second IGP instance, topology information for link states internal to the first AS; and
   a second channel physically linked with the second AS, the second IGP instance operating on the second channel to provide a second IGP routing level between the second AS and the node, the second IGP instance configured on the node to receive, and to leak to the first IGP instance, topology information for link states internal to the second AS;

the first IGP instance further configured to include the information leaked by the second IGP instance in external link state advertisements in the first AS;

the second IGP instance further configured to include the information leaked by the first IGP instance in external link state advertisements in the second AS.

2. The aggregation of claim 1, wherein the node is further configured to provide a pair-wise interface between the aggregation and a network outside the aggregation.

3. The aggregation of claim 1, wherein the second IGP routing level is at a higher level of abstraction than the first IGP routing level.

4. The aggregation of claim 1, wherein the node comprises:
a first routing table describing a topology of the first As; and
a second routing table describing a topology of the second AS.

5. The aggregation of claim 1, wherein the node comprises lower and upper link state databases, each database associated with a corresponding one of the routing levels;
wherein each of the databases is configured to receive topology information from the other database.

6. The aggregation of claim 1, wherein at least one of the ASs comprises a mobile ad-hoc network (MANET).

7. The aggregation of claim 1, wherein the aggregation is an AS.

8. An aggregation comprising:
first and second autonomous systems (ASs); and
a plurality of backbone nodes between the first and second ASs, the nodes in peer relationship with one another and operative to aggregate the first and second ASs to form a third AS via a plurality of hierarchical routing levels of the nodes, each routing level defined by a corresponding internal gateway protocol (IGP) instance such that (a) each of the backbone nodes receives, at a first IGP routing level at which the node is physically linked with the first AS, topology information from backbone internal to the first AS, (b) each of the backbone nodes leaks the received topology information to a second IGP routing level at which the node is physically linked with the second AS, and (c) each of the backbone nodes announces, at its second routing level, the leaked information as one or more external link state advertisements to the second AS.

9. The aggregation of claim 8, each node further comprising:
a first channel through which the node is linked with the first AS at a first of the IGP routing levels; and
a second channel through which the node is linked with the second AS at a second of the IGP routing levels;
wherein the nodes share a link state local to the first AS at the first routing level and share a link state local to the second AS at the second routing level.

10. The aggregation of claim 8, wherein each of the hierarchical routing levels comprises a corresponding instance of an interior gateway protocol (IGP).

11. The aggregation of claim 8, wherein one of the hierarchical routing levels comprises an instance selected from the group consisting of Open Shortest Path First (OSPF) protocol and Intermediate System-Intermediate System (IS-IS) protocol.

12. The aggregation of claim 8, wherein at least one of the nodes is configured to provide a pair-wise interface between the aggregation and a fourth AS.

13. The aggregation of claim 8, wherein the nodes provide a mesh interface between the first and second ASs.

14. The aggregation of claim 8, wherein one of the nodes comprises a plurality of IGP instances.

15. An aggregated autonomous system (AS) comprising: a plurality of ASs including at least first and second ASs; and
at least one backbone node of the first and second ASs, the node having first and second interior gateway protocol (IGP) instances operative in the node to provide a hierarchical interior gateway protocol (IGP) interface between backbones of the first and second ASs, the first IGP instance associated with the first AS, the second IGP instance associated with the second AS, each of the first and second IGP instances configured to leak, locally in the node, topology information describing backbone within its associated AS to the other of the first and second IGP instances, and to announce to its associated AS, via external link state advertisement, the backbone topology information leaked by the other of the first and second IGP instances.

16. The aggregated AS of claim 15, wherein the ASs comprise a coalition network.

17. The aggregated AS of claim 15, wherein at least one of the hierarchical interfaces comprises a interior gateway protocol instance different from an interior gateway protocol instance of another of the hierarchical interfaces.

18. The aggregated AS of claim 15, further comprising a plurality of backbone nodes providing a plurality of hierarchical IGP interfaces, wherein the hierarchical interfaces comprise a mesh interface among the ASs.

19. The aggregated AS of claim 18, further comprising tiers of the ASs and wherein a given one of the nodes provides routing information relating to a first tier to a hierarchical interface provided by the given node and associated with a second tier.

20. A method of communicating with a second autonomous system (AS) via a first AS, the method performed by a backbone router of the first and second Ass, the router including a plurality of interior gateway protocol (IGP) instances, each instance operating at a corresponding level of a hierarchy of IGP routing levels, the method comprising:
receiving a packet from the first AS at a first IGP routing level of the backbone router; and
routing the packet at a second IGP routing level of the backbone router to the second AS;
the receiving and routing steps comprising:
receiving, at the second IGP routing level over a channel physically connecting the second AS with the router, advertisement of link states internal to the second AS;
leaking within the router topology information as to the internal link states from the second IGP level to the first IGP level; and
issuing at the first ISP level of the backbone router to the first AS one or more external link state advertisements based on the leaked topology information.

21. The method of claim 20, further comprising using a second backbone router to receive the packet at the second IGP routing level and to route the packet at a third IGP routing level to the second AS.

22. The method of claim 20, further comprising routing the packet between at least two tiers of a plurality of tiers of networks connected via the backbone router.

23. The method of claim 20, further comprising routing the packet from the second AS via a pair-wise interface to an autonomous system (AS) distinct from the first and second ASs.

24. A machine-readable medium for use with a processor having a memory, the machine-readable medium comprising:
instructions executable by the processor to cause a router of a backbone inter-connecting a plurality of autonomous systems (ASs) including first and second ASs to execute a plurality of interior gateway protocol (IGP) instances at a corresponding plurality of routing levels of the router;
instructions executable by the processor to cause the router to receive a packet from the first AS at a first IGP routing level of the router; and
instructions executable by the processor to cause the router to route the packet to the second AS at a second IGP routing level of the router based on topology information received over a channel physically linking the router and the second AS at the second routing level and describing link states internal to the second AS, the topology information leaked in the router from the second IGP level to the first IGP level and advertised to the first AS at the first IGP level as one or more external link states.

25. The medium of claim 24, further comprising instructions to cause a second router of the backbone to receive the packet at the second routing level and to route the packet at a third IGP routing level to the second AS.

26. The medium of claim 24, further comprising instructions to cause the router to receive the packet from a subnet of the first AS.

27. The medium of claim 24, further comprising instructions to cause a second router of the backbone to receive the packet at the second routing level and to route the packet via a pair-wise interface to an autonomous system (AS) outside the plurality of interconnected ASs.

* * * * *